(12) United States Patent
Platini et al.

(10) Patent No.: US 12,339,182 B2
(45) Date of Patent: Jun. 24, 2025

(54) APPARATUS FOR MONITORING MECHANICAL JOINTS OF RAILWAY RAILS

(71) Applicant: G.C.F. GENERALE COSTRUZIONI FERROVIARIE S.P.A., Rome (IT)

(72) Inventors: Massimo Platini, Rome (IT); Elisa Duca, Como (IT); Marco Renzetti, Rome (IT); Marco Cavaciuti, San Donato Milanese (IT)

(73) Assignee: G.C.F. GENERALE COSTRUZIONI FERROVIARIE S.P.A., Rome (IT)

( * ) Notice: Subject to any disclaimer, the term of this patent is extended or adjusted under 35 U.S.C. 154(b) by 137 days.

(21) Appl. No.: 17/766,863

(22) PCT Filed: Oct. 12, 2020

(86) PCT No.: PCT/IB2020/059574
§ 371 (c)(1),
(2) Date: Apr. 6, 2022

(87) PCT Pub. No.: WO2021/070161
PCT Pub. Date: Apr. 15, 2021

(65) Prior Publication Data
US 2024/0085255 A1 Mar. 14, 2024

(30) Foreign Application Priority Data
Oct. 11, 2019 (IT) .................. 102019000018578

(51) Int. Cl.
*G01L 1/24* (2006.01)
*B61K 9/08* (2006.01)

(52) U.S. Cl.
CPC .............. *G01L 1/246* (2013.01); *B61K 9/08* (2013.01)

(58) Field of Classification Search
CPC ...................................................... G01L 1/246
See application file for complete search history.

(56) References Cited

U.S. PATENT DOCUMENTS

2004/0114850 A1\* 6/2004 Dewyntermarty ........................... G01D 5/35316
385/13

FOREIGN PATENT DOCUMENTS

EP 3388812 A1 10/2018

OTHER PUBLICATIONS

Buggy et al. Meas. Sci. Technol. 27 055201, 2016 (Year: 2016).\*

(Continued)

*Primary Examiner* — Walter L Lindsay, Jr.
*Assistant Examiner* — Andrew V Do
(74) *Attorney, Agent, or Firm* — ArentFox Schiff LLP; Michael Fainberg

(57) ABSTRACT

A monitoring apparatus for mechanical joints of railway rails is provided. The monitoring apparatus has a tubular shaped body, two terminations disposed at ends of the tubular shaped body, and a strain gauge placed inside the tubular shaped body between the two terminations, stabilized to and integral with an end of a railway rail. The strain gauge is configured to be blocked and tensioned so that a variation of length and mechanical tension of the strain gauge, caused by a relative movement of the two terminations, is matched by a variation of a wavelength of an optical signal passing through the strain gauge. A railway track and a kit for a railway mechanical joint including the monitoring apparatus are also provided.

15 Claims, 5 Drawing Sheets

(56) References Cited

OTHER PUBLICATIONS

International Search Report, issued in PCT/IB2020/059574, mailed Feb. 9, 20201, Rijswijk, NL.
Buggy S. J. et al., Railway track component condition monitoring using optical fibre Bragg grating sensors, Measurement Science and Technology, Mar. 22, 2016, p. 55201, vol. 27, No. 5, IOP Publishing Ltd., Bristol, GB.

* cited by examiner

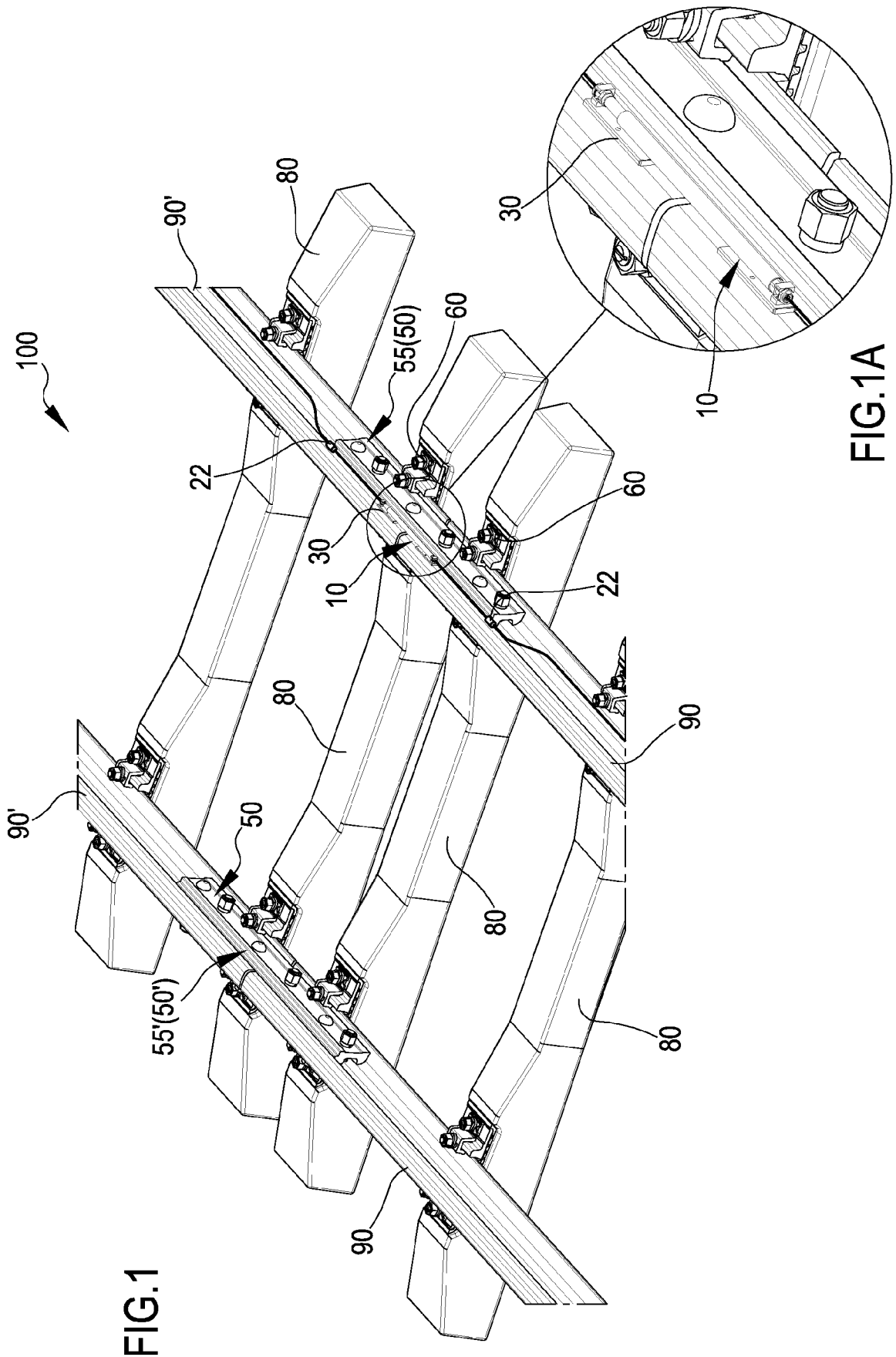

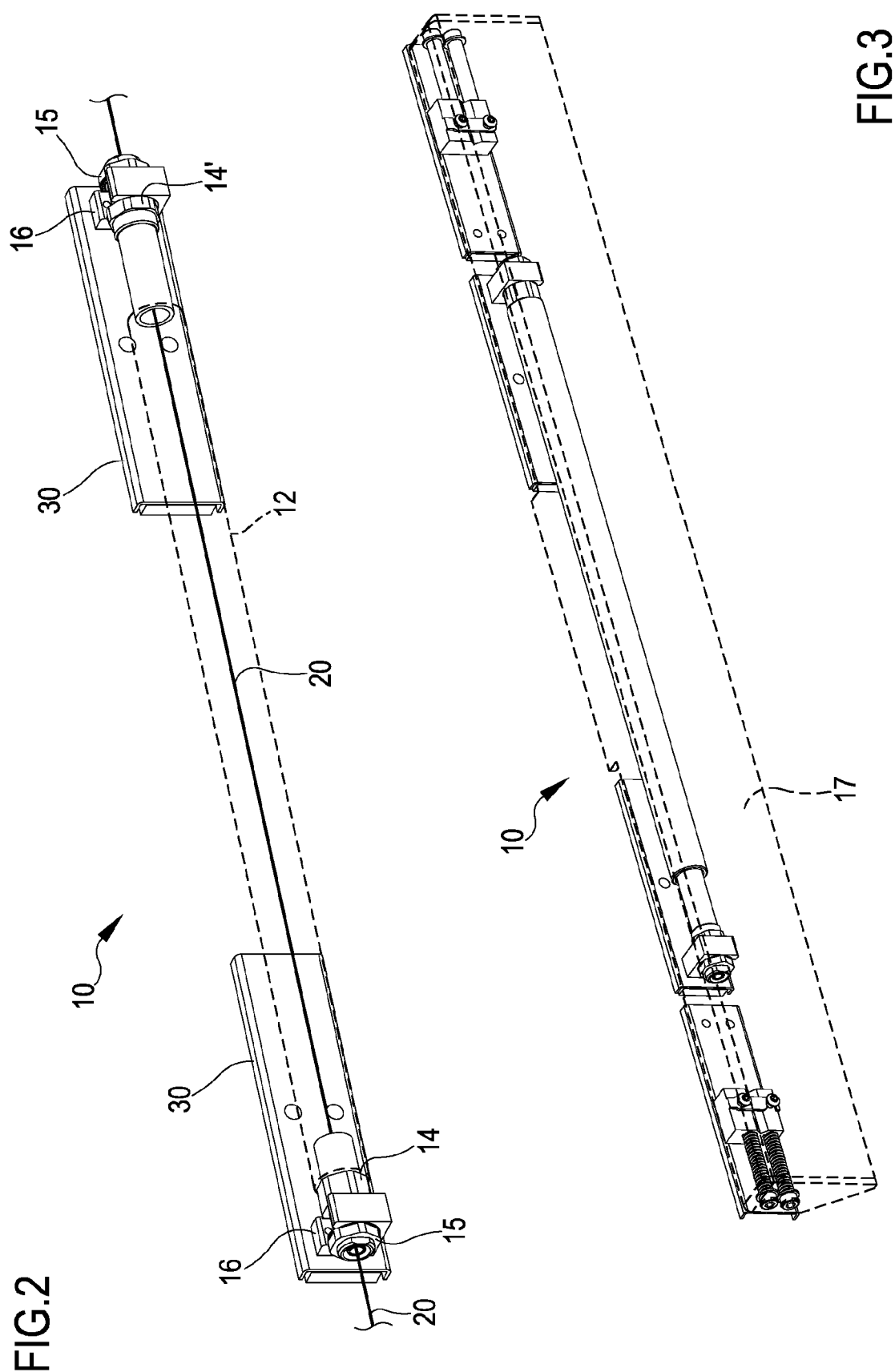

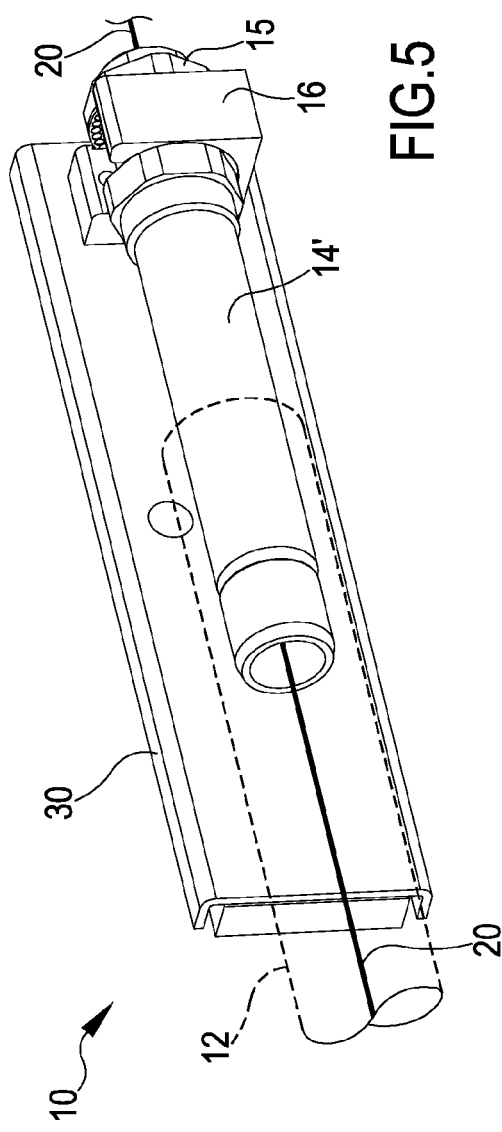
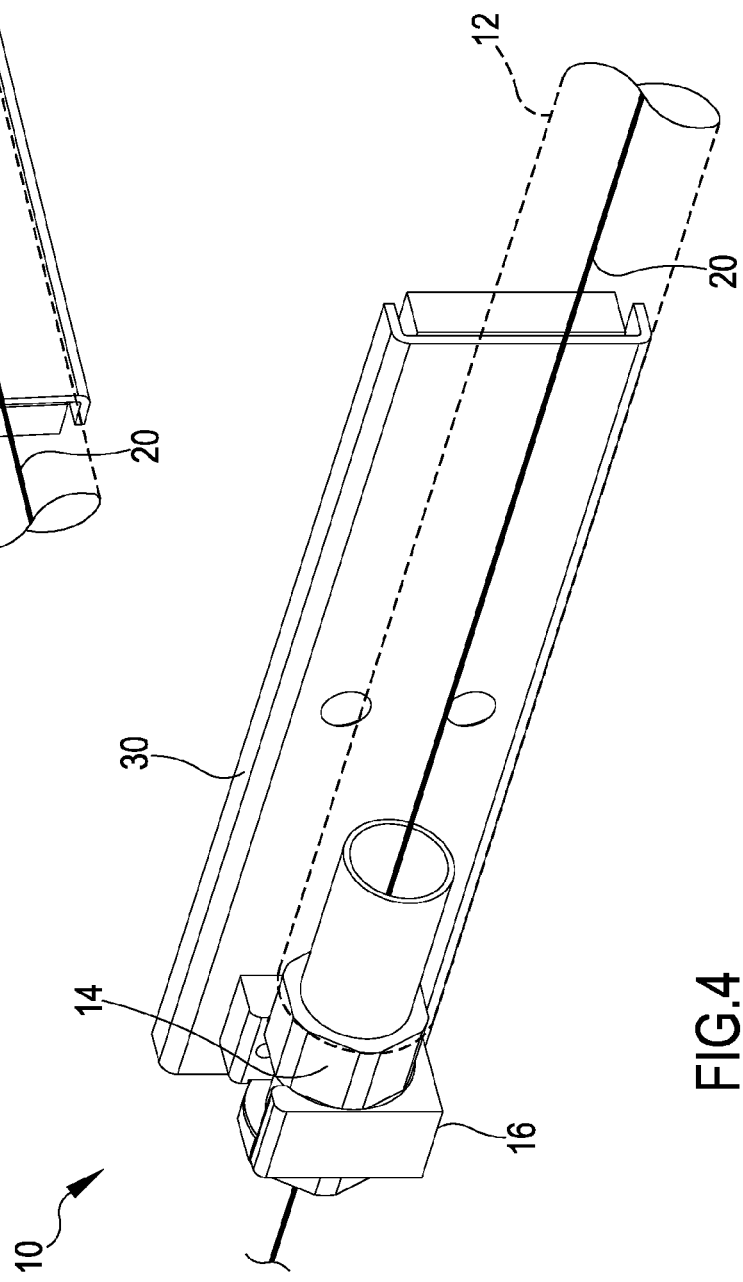

APPARATUS FOR MONITORING MECHANICAL JOINTS OF RAILWAY RAILS

CROSS-REFERENCE TO RELATED APPLICATIONS

This application is a National Phase Application of PCT International Application No. PCT/IB2020/059574, having an International Filing Date of Oct. 12, 2020 which claims priority to Italian Application No. 102019000018578 filed Oct. 11, 2019, each of which is hereby incorporated by reference in its entirety.

FIELD OF THE INVENTION

The present invention refers to an apparatus for monitoring mechanical joints of railway rails.

More particularly, the present invention refers to an apparatus for monitoring on-the-field a mechanical joint of train or streetcar rails, preferably for monitoring an electrically insulated railway mechanical joint.

BACKGROUND OF THE INVENTION

The joining devices or mechanical joints for the ends of train or streetcar tracks are well known in the state of the art.

However, nowadays, in the modern manufacturing technology of railway superstructures, the preferred method used for joining lengths of a section bar of a rail is the aluminothermal welding, which is a process adapted to obtain a so-called "long welded rail" which is then fixed and stabilized to the ties of a track, by a thermal conditioning and adjusting process which is such to prevent any movement and to eliminate expansions caused by differences of temperature in the rail.

However, since said long welded rail has a great extension, it must be necessarily interrupted and joined at terminal joining points and connected to other lengths of rail or breather switch by jaw-type conventional mechanical joints.

Railways lines, which due to safety reasons use a system for blocking a train circulation, are divided in electrically insulated blocking sections at regular distance intervals, in order to form a plurality of "track circuits" traversed by respective locking currents. This system enables to obtain information, as an electric signal, regarding the positions of the rolling stock along the railway, wherein the term "rolling stock" means locomotives, cars, railway convoys or generally trains.

The electric insulation of the different contiguous blocking sections is ensured by using insulated-type or insulating mechanical joints adapted to maintain the electric insulation between the ends of rail lengths and, simultaneously, the physical and structural continuity of the railway line is ensured. The insulated mechanical joint, as opposed to the conventional mechanical joint, comprises fixing elements (jaws and bolts or rag-bolts) having surfaces made of an electrically insulating material and comprises also an electrically insulating shape or shim interposed in the interstitial gap between the ends of the rail lengths.

The mechanical joints, both conventional and insulated and, generally, the discontinuous rail spliced ends have however inconveniences and operative limits.

The mechanical joint and the terminal portions of rails connected by the joint are generally subjected to different types of mechanical stresses typically determined by:

daily or seasonal cyclic thermal expansions or stresses of the rail, which are typically linear;

vertical loads determined by the weight exerted by the axles and wheels of the rolling stock;

transversal loads determined by meandering movements and by the advancements along a turn of the railway convoy wheelsets;

longitudinal loads determined by accelerations and decelerations of the rolling stock at or in proximity of the joint.

In addition to the above described stresses, generally uniformly present along a railway path, the mechanical joint is particularly subjected to concentrated phenomena determined, for example, in case of an insulated joint, by the wear of the insulating shape or shim (generally made of a plastic polymeric material) between the rail ends, these phenomena are such to form a discontinuous length having a gap between the two rails causing parasitic motions which are activated every time the moving wheelsets jolt when they roll on the discontinuous length.

Moreover, such phenomena can generate further mechanical stresses and load transfers to the mechanical joint, which in turn contribute to increase the typical phenomena of wear such as:

detachment of the joint and early wear of the rail ends;
end crushing of the rail ends and metal material creep/fatigue,
breakage or deformation of the jaws of the mechanical joint and loosening of bolts or screws of the rag-bolts.

Some of these wear or movement phenomena are actually monitored by the system of the rail circuits, such as for example the material creep, while the wear phenomena which comprise a detachment or separation of the rail ends now can be only monitored by on-the-field scheduled inspections.

A typical inconvenience of the mechanical-type, both traditional and insulated, railway joints is that it is not possible to check in real time the conditions thereof: a possible anomaly, breakage, movement or malfunction which are such to compromise the rail continuity due to separations or misalignments of the rail ends with consequent possibly fatal danger conditions for the moving rolling stock.

A further inconvenience of the mechanical-type, both conventional and insulated, railway joints is that they are subjected to eddy electric currents and substantial electromagnetic fields, determined by the electrification of railway line, which limit or prevent the use of electric or electronic-type monitoring systems.

OBJECTS OF THE INVENTION

It is an object of the present invention to overcome and solve, at least partially, the above cited operative inconveniencies and limits.

More particularly, an object of the present invention consists of providing a monitoring apparatus for mechanical joints of railway rails capable of enabling to constantly, continuously, remotely monitoring the state and the mechanical integrity of the joint and of the joining portion of the rails.

A further object of the present invention consists of providing a user with an on-the-field monitoring apparatus for a railway rail mechanical joint capable of detecting in real time possible anomalies and discontinuities of the rail by generating an alarm for the signaling systems of the railway line.

A further object of the present invention consists also of providing a monitoring apparatus for mechanical joints of railway rails capable of enabling to constantly, continuously, remotely monitor the state and mechanical integrity of the wheels and axles (wheelsets) moving in correspondence of the joining portion of the rails.

A still further object of the present invention consists of providing a monitoring apparatus for mechanical joints of railway rails capable of ensuring a high level of resistance and reliability over time and further such to be easily manufacturable at a low cost.

These and other objects are met by the monitoring apparatus for mechanical joints of railway rails object of the present invention according to the independent claim.

The constructive and operative characteristics of the monitoring apparatus could be better understood from the following detailed description, referring to the attached drawings representing a preferred and non-limiting embodiment, wherein:

BRIEF DESCRIPTION OF THE FIGURES

FIG. 1 is a schematic representation of a partial axonometric view of the track of conventional railway superstructures in the joining portion between two discontinuous (unwelded) sections, the monitoring apparatus for mechanical joints of railway rails, object of the present invention, being disposed straddling the two sections at the mechanical joint;

FIG. 1a is a detailed schematic representation of a view in FIG. 1 with the monitoring apparatus for mechanical joints of railway rails object of the present invention;

FIG. 2 is a schematic representation of a partially phantom axonometric view of a preferred embodiment of the monitoring apparatus for mechanical joints of railway rails object of the present invention;

FIG. 3 is a schematic representation of a partially phantom axonometric view of a preferred embodiment of the monitoring apparatus for mechanical joints of railway rails object of the present invention, provided with a protecting covering;

FIGS. 4 and 5 are schematic representations of partial axonometric views of terminal portions of the monitoring apparatus for mechanical joints of railway rails object of the present invention with the terminations and fixing means for the rail;

DETAILED DESCRIPTION OF THE INVENTION

Figure 6:
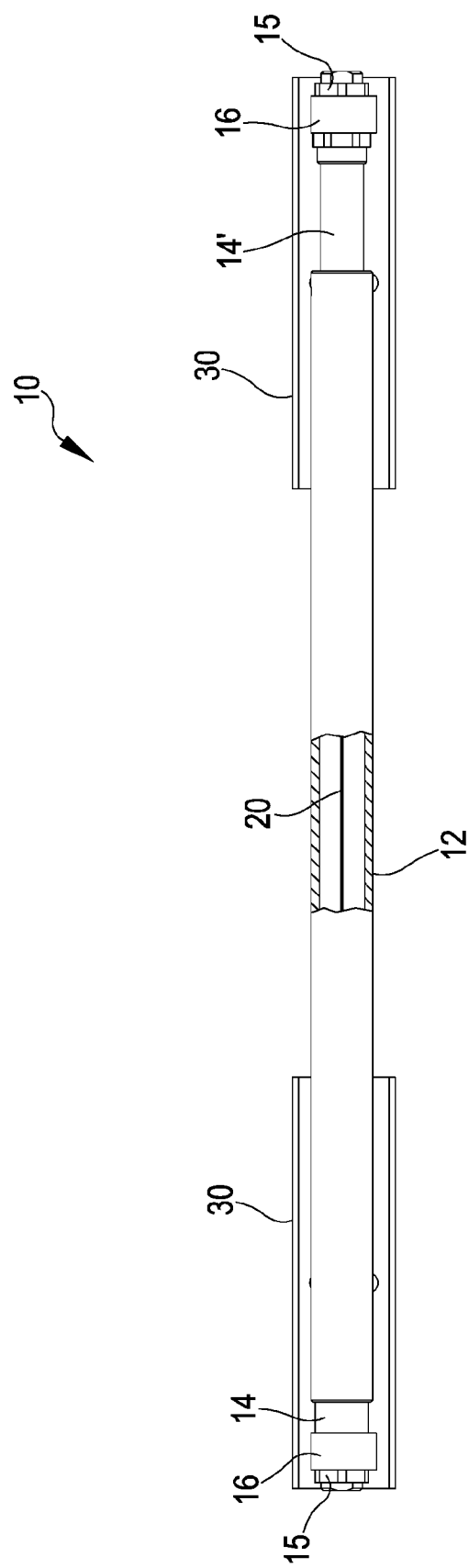
FIG. 6 is a schematic representation of a plan orthogonal projection of the monitoring apparatus for mechanical joints of railway rails object of the present invention.

Referring to FIG. 1, a portion of a rail of typical railway superstructures 100 comprising the joint of two sections of a track having two pairs of parallel rails 90, 90' connected at the ends by two conventional joints 50, 50' and stabilized to a plurality of ties 80 by conventional blocking elements 60 is shown.

A person skilled in the art will understand from the description as the present invention can be also applied to an insulated mechanical joint 55, 55' adapted to separate and make electrically independent two track sections with the respective track circuits.

Referring particularly also to FIGS. 1a to 6, the monitoring apparatus for the mechanical joints 50, 50', 55, 55' of the railway rail 90, 90', generally indicated by 10 in the figures, comprises:
- a body 12, preferably but in a non-limiting way having a tubular telescopic-type shape having a cylindrical or polygonal cross-section, possibly irregular;
- two terminations 14, 14' disposed at the ends of said body 12.

The monitoring apparatus 10 comprises an optical fiber strain gauge 20, preferably a FBG (Fiber Bragg Grating) type sensor placed inside the body 12 between said terminations 14, 14', each adapted to be stabilized and integral with an end of the rail 90, 90', where said rails are integrally joined by a conventional mechanical joint 50 or by an insulated joint 55, said strain gauge 20 being adapted to be blocked and tensioned so that a variation thereof of the length and mechanical tension, determined by a relative movement of the terminations 14, 14', is matched by a variation of the wavelength of the generated optical signal passing through the strain gauge 20.

In the preferred embodiment of the figures, said strain gauge 20 is generally an optical fiber thread defining an FBG-type optical fiber sensor.

Moreover, the monitoring apparatus 10 can comprise at least two supports 16 adapted to integrally block, by known fixing means 30, said terminations 14, 14' at the facing ends of each rails 90, 90'.

Said fixing means 30 can comprise screw-type threaded couplings, bolts or similar, or can comprise magnetic supports or made of a magnetizable or ferromagnetic material adapted to be attracted and stably fixed to each rail 90, Said fixing means 30 can further comprise conventional fixed connections, such as welds or direct gluings on the rail 90, 90'.

Figure 7:
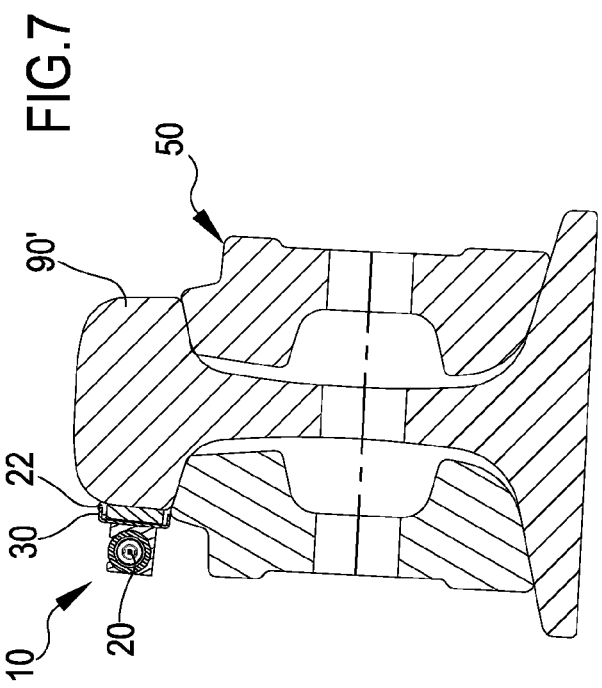
FIG. 7 is a schematic representation of a cross-section view of a rail provided with jaws of a railway joint and of the monitoring apparatus for mechanical joints of railway rails object of the present invention.
Figure 8:
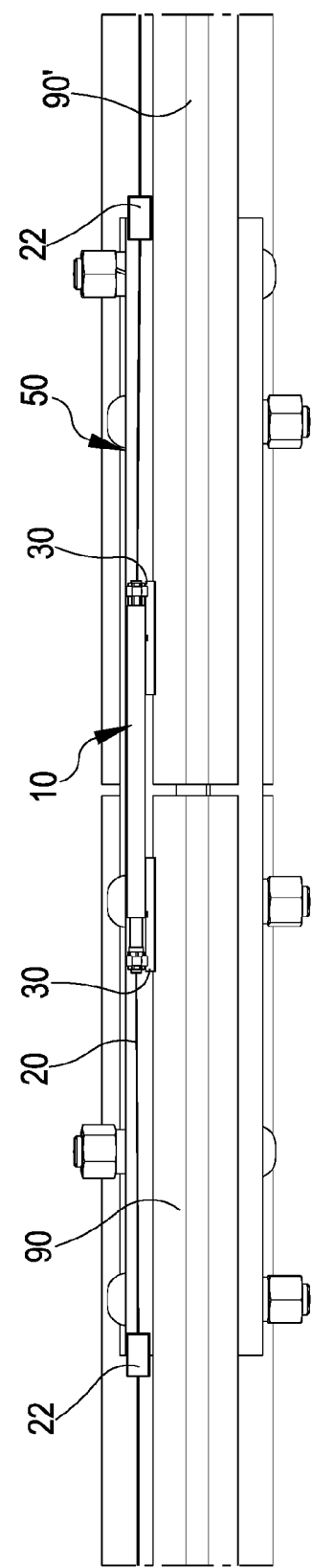
FIG. 8 is a schematic representation of a plan view of a rail provided with jaws of a railway joint and of the monitoring apparatus of mechanical joints of railway rails object of the present invention.

Referring also to FIGS. 7 and 8, the monitoring apparatus 10 object of the present invention, is adapted to be integrally and firmly connected to the facing ends of each rail 90, 90', along the welded rail or length of rail, said monitoring apparatus 10 being adapted to straddle the joint 50 with anchoring points generally placed at the terminations 14, 14' and integrally stabilized to each rail 90, 90' by fixing means 30. Advantageously, the monitoring apparatus 10 can be disposed on both the mechanical joints 50, 50' or insulated joints 5, 5' connecting the two rail sections.

The strain gauge 20, comprising an optical fiber thread, is advantageously blocked and tensioned between the two terminations 14, 14' which are slidingly facing each other so that a relative movement of the terminations 14, 14' is matched by a length variation of the optical fiber thread of the strain gauge 20.

The theoretical distance between the two terminations 14, 14' in condition of use can be variable and is generally set in order to ensure the optical fiber thread of the strain gauge 20 to have a length such to provide the thread itself with a resiliency allowing it to follow, without breaking, the normal expansion movements between the two ends of rail 90, 90'.

The terminations 14, 14' can have a tubular shape having not necessarily a regular cylindrical or polygonal cross-ssection. A portion of the optical fiber thread of the strain gauge 20 is fixed by respective supports 16, while an adjusting portion is provided with a mechanism adapted to enable the terminations 14, 14' themselves to slide with respect to the supports 16. Such adjusting mechanism can comprise a movable mechanical coupling enabling to adjust the mechanical tension of the optical fiber thread of the strain gauge 20.

Referring particularly to FIGS. 2, 4, 5 and 6, in a preferred embodiment, said adjusting portion can comprise, for example, a conventional threaded coupling between the terminations 14, 14' and a nut 15, so that a screwing rotation of the nut 14 is matched by a translation of the termination 14' with respect to its support 16.

Still referring to the same figures, coaxially between said terminations 14, 14' is generally disposed a tubular body 12 adapted to protect the optical fiber thread of the strain gauge 20 in the tensioned section having a variable length comprised between the terminations 14, 14' themselves.

Advantageously, said body 12 can be integrally stabilized, for example, to a termination 14, and slidingly telescopically coupled to the opposite termination 14' in order to compensate the relative movements between the terminations 14, 14' themselves.

In a variant, not shown, the body 12 can be also formed by two separated portions coaxially integrally stabilized to the terminations 14, 14', in order to follow the deformations of the rail without preventing the optical fiber from expanding.

Advantageously, said body 12 can be further made of a transparent material so that it would be possible to inspect the state of integrity of the optical fiber thread of the strain gauge 20.

Referring in particular to FIG. 3, the monitoring apparatus 10 can be also advantageously covered by a casing 17 providing a protection against dirt, foreign bodies, and environmental agents.

Said monitoring apparatus 10 can be also further provided with gripping handles, not shown, placed at said terminations 14, 14' or said casing 17.

Referring again to FIG. 1 and FIG. 8, the monitoring apparatus may comprise additional FBG-type sensors serially or consecutively connected to the fiber thread itself in series with the strain gauge 20 or on a dedicated distinct fiber conductor, the additional FBG-type sensors being configured to detect further parameters and physical state magnitudes of the junction portion of the rail. Specifically, the monitoring apparatus 10 may comprise at least two further FBG sensors 22 disposed and stabilized directly on the surface of each end of the rails 90, 90', preferably in correspondence of the head and web of the rail 90, 90', and preferably in proximity of the junction zone, so that it is possible to detect the intrinsic parameters of each rail 90, 90', such as thermal expansion, vibrations or independent shaking movements of the rails 90, 90'.

Said further FBG sensors 22 can be advantageously placed in cooperation with the strain gauge 20, because in comparison with to this latter, they are adapted to detect the intrinsic physical parameters regarding each single rail 90, 90' independently from the consecutive rail connected by the mechanical joint 50, 55. Actually, while the strain gauge 20 detects the relative movement between the two rails 90, 90' connected by the joint 50, 55, the FBG sensors 22 detect the intrinsic movements of the rail determined for example by the thermal expansion of each rail.

The data detected by the further FBG sensors 22 can be used by a computer and correlated, in compensation, to the data received from the strain gauge 20 in order to supply the real measure of the displacement between the ends of rails 90, 90', by taking also in consideration the thermal expansions.

The monitoring apparatus 10, object of the present invention, can comprise also further FBG sensors 22 adapted to detect, for example, the temperature at each rail 90, 90'.

Still referring to FIG. 1, it is also an object of the present invention a portion 100 of railway superstructures, or railway track comprising at least two rails 90, 90', a plurality of ties 80 and two mechanical joints 50, 55, 50', 55' provided with respective fixing means, screws, etcetera, comprising at least one monitoring apparatus 10 according to the present invention.

It is also an object of the present invention a joint or a kit for a mechanical railway joint (not shown) comprising a conventional mechanical joint 50, 50' or a conventional insulated joint 55, 55' of a railway type, having two jaws, a plurality of fixing bolts or rag-bolts, said joint or kit advantageously comprising also a monitoring apparatus 10 according to the present invention.

In an alternative embodiment, said monitoring apparatus 10 can be manufactured and marketed integrated or temporarily fixed to the jaw of a conventional railway mechanical joint 50, 50' or insulated joint 55, 55', for example by connections separatable by deformation or mechanically separatable, such as fins or discontinuous parts and segments, so that it is positioned and aligned with the joint itself. Then, once the joint is mounted, the weak fastenings at the jaw can be removed or cut in order to make the monitoring apparatus only integral with the rails 90, 90'.

From the description of the monitoring apparatus for mechanical joints of railway rails object of the present invention, it is understood the operation described in the following.

With reference to the cited figures, the monitoring apparatus 10, object of the present invention, in a preferred embodiment, joins together in an innovative way, known FBG sensors and a conventional railway type mechanical joint.

The monitoring apparatus 10 therefore defines a gripping device having a stiffness such to ensure to correctly and effectively transfer the mechanical deformation of the rails 90, 90' to the optical fiber thread of the strain gauge 20 and to the FBG sensors 22 (if are present) simultaneously enabling to support and tension the optical fiber thread itself without breaking it.

The signal generated by an optical source is transferred to an optical circuit in the same transmissive medium through one or more strain gauges 20 and through further FBG sensors 22 placed at and straddling the joining portion of one or more simple or insulated mechanical joints 50, 55'.

Monitoring the mechanical joint 50, 55 is possible only by the rigid connection between the two terminal parts of the ends of the rail 90, 90' and the fiber thread of the strain gauge 20, which is generally placed in a direction substantially axial to the longitudinal axis of the rail 90, 90'.

The optical fiber FBG (Fiber Bragg Grating) type sensors are provided with optical fiber elements, called also Bragg gratings having bands of a material with different refraction indexes and alternated with each other in order to filter a specific wavelength of the light signal passing through the transmissive medium. When the optical thread of the strain gauge 20, in which the Bragg grating is placed, changes its length due to a relative movement
between the two ends of the rails 90, 90', consequently the filtered wavelength of the light signal generated by the optical source changes.

It is evident than an absence of the optical signal exiting the strain gauge 20 and returning to the receiver or computer, is determined by a broken condition of the strain gauge 20 due to a complete separation of the ends of the rails 90, 90' and to the breakage of the mechanical joint 50, 55.

The variation of the wavelength enables to optically measure, by a colorimetric sensor at the receiver which analyzes the wavelength of the signal absorbed by the grating, the mechanical deformations of the joint portion of the sections of the railway track by advantageously exploiting the expansion induced in the fiber thread of the strain gauge 20 fixed to and integral with the rails 90, 90' of which it is desired to measure the deformation and relative movements.

The strain gauge 20, straddling the rails 90, 90', with the mechanical joint 50, 55, enables to measure the relative distance variation between two ends of the rails 90, 90', supplying a signal with the information about the movement of the ends of the rails to an optical signal receiver which can be placed at a great distance from the monitored point. Processing the digital signal of the wavelength and determining the measure can be performed in a second time by a central processing unit, or central acquisition place PCA, which determines the condition of the joint.

Advantageously, the monitoring apparatus 10 can be easily stabilized to the rail 90, 90' by fixing means 30 comprising also magnetic supports.

The terminations 14, 14' or casing 17 can also advantageously comprise handles (not shown) enabling an operator to position the monitoring apparatus 10 and such to allow the same to exert a sufficient force so that he/she can correctly handle the apparatus itself when mounting it on the railway joint part.

In order to correctly align the monitoring apparatus 10, in the preferred embodiment with the fixing means 30 comprising the magnetic supports, it is possible to use the flat upper edge of the jaw of the mechanical joint 50, 55 as abutment plane substantially parallel to the rail 90, 90'. The operator, by approaching the monitoring apparatus 10 to the jaw of the joint 50, 55 and gripping the same by the handles, aligns the corner with the upper surface of the jaw, maintaining the surfaces of the magnetic supports facing upwardly. Once the monitoring apparatus 10 abuts and is aligned with the jaw, the operator rotates it so that the face of the magnetic supports slightly rotates until it abuts and is strongly attracted to the rail 90, 90'.

In a further alternative embodiment, not shown, the magnetic supports can be provided with selectors capable of enabling or disabling the magnetic field during an installation step.

Using the fixing means 30 with a magnetic support, with respect to the conventional fixing means for example with threaded elements, has the advantage of enabling to quickly disassemble the monitoring apparatus 10 when servicing the rail 90, 90' or of the mechanical joint (50, 50', 55, 55') and to not require treatment or processing operations of the contact surface of the rail 90, 90' itself in order to start the installation of the monitoring apparatus 10.

Further FBG sensors 22 (FIGS. 1 and 8) can be stabilized or integrated on a rail 90, 90' and connected to the same transmission optical medium of the same strain gauge 20 or on a separated optical conductor. Said FBG sensors 22 integrate and enrich the information about the state of the rail, providing, for example, information regarding the deformations caused, for example, by intrinsic thermal expansions of each rail 90, 90'. Said FBG sensors 22 can, for example, measure a dimensionless magnitude of the thermal expansion defined by a ratio AUL wherein such measure, multiplied by a distance between the end of the rail 90, 90' and the anchoring point of the support 16, will be the amount to be subtracted to the measure of the strain gauge 20 in order to obtain the real distance separating the ends of the rails 90, 90' facing at the mechanical joint 50, 50', 55, 55'. Said FBG sensors 22 further enable to detect the vibrations determined by the wheels of the rolling stock passing on the joint, these vibrations for example enable to check the passage of a convoy in a determined point or to count the axles.

Said FBG sensors 22 can also detect information about the temperature of the rails 90, 90', consequently supplying further and more information useful to evaluate the wear state of the rails 90, 90' and railway line.

Detecting the mechanical vibrations by the suitably processed optical signal exiting the FBG sensors 22, enables also to supply information enabling to determine, besides the physical presence of a railway convoy passing at the joint, also the integrity and mechanical state of the wheels and axles, as a function of the characteristics of the vibration produced by the same and detected by the FBG sensors 22.

This innovative monitoring apparatus 10, integrated into the nowadays used railway signaling systems, enables the user to constantly monitor the railway equipment and to constantly check the optimal parameters and provides an alarm system which verifies, in real time, possible anomalies
   along the railway line, such as breakages of mechanical joints, detachments and misalignments of the rail ends such to compromise the continuity and operability and safety of the railway line.

As it is possible to observe from the preceding description, the advantages of the monitoring apparatus 10 for railway joints object of the present invention are evident.

The monitoring apparatus 10 is particularly advantageous since provides a user a system for monitoring and controlling the physical state of the joining part of the rail which in a normal worn condition must fall inside threshold values, and must be capable of detecting and signaling, in real time, anomalies and discontinuities in the railway line and in the mechanical parts of the rolling stock, which can cause potentially fatal incidents.

A further advantage due to the present invention is given by the use of an optical fiber and FBG sensors, which make the monitoring apparatus 10 particularly advantageous especially for the use in cooperation with insulated joints 55, 55', because the optical fiber transmissive medium does not transport electric energy and therefore is not subjected to form an electric bridge which could bypass the insulated joint 55, 55'.

A still further advantage of the monitoring apparatus 10 object of the present invention is determined by the fact the FBG sensors and the optical fiber transmissive medium are insensitive to magnetic fields and electric noises caused by the railway supply voltage besides being particularly strong and insensitive to high temperatures.

While the invention was hereinbefore described particularly with reference to a preferred embodiment, given in an exemplifying non-limiting way, many modifications and variants will appear obvious to a person skilled in the art in light of the above given description. Therefore, the present invention intends to comprise all the modifications and variants falling in the spirit and scope of the following claims.

The invention claimed is:

1. A monitoring apparatus for mechanical joints of railway rails, comprising:
   a tubular shaped body;
   two terminations disposed on ends of said tubular shaped body; and an optical fiber strain gauge, disposed inside the tubular shaped body between said two terminations, each termination being adapted to be stabilized to and integral with an end of a railway rail, wherein said strain gauge comprises an optical fiber thread that is blocked and tensioned between the two terminations slidingly placed facing each other so that a relative movement of the two terminations is matched by a variation of a length of the optical fiber thread of the strain gauge, and wherein the variation of the length and a variation of mechanical tension of the strain gauge being matched by a variation of a wavelength of an optical signal passing through the strain gauge.

2. The monitoring apparatus of claim 1, wherein said strain gauge is the optical fiber thread defining a Fiber Bragg Grating (FBG) type sensor.

3. The monitoring apparatus of claim 1, comprising at least two supports, the at least two supports being configurable to integrally block, by fixing means, said two terminations on facing ends of each railway rail.

4. The monitoring apparatus of claim 3, wherein said fixing means comprise screw-type threaded couplings, and bolts.

5. The monitoring apparatus of claim 3, wherein said fixing means comprise magnetic supports or supports made of a ferromagnetic material adapted to be stably attached to each railway rail.

6. The monitoring apparatus of claim 3, wherein said fixing means comprise connections welded or glued directly to each railway rail.

7. The monitoring apparatus of claim 1, wherein the two terminations have a portion adapted to be fixed to respective supports, and an adjusting portion to adjust tension of the optical fiber thread of the strain gauge.

8. The monitoring apparatus of claim 1, wherein said tubular shaped body and said two terminations have a tubular shape having cylindrical or polygonal cross-section.

9. The monitoring apparatus of claim 1, wherein said tubular shaped body is integrally stabilized to one of said two terminations and slidingly telescopically coupled to the opposite termination, said tubular shaped body being coaxially placed between said two terminations.

10. The monitoring apparatus of claim 1, wherein said tubular shaped body coaxially placed between said two terminations, comprises two separated portions, coaxially integrally stabilized to the two terminations, said two separated portions being slidingly telescopically placed with respect to each other.

11. The monitoring apparatus of claim 1, wherein said tubular shaped body is made of a transparent material.

12. The monitoring apparatus of claim 1, further comprising a protective casing.

13. The monitoring apparatus of claim 1, wherein said strain gauge is the optical fiber thread defining at least two Fiber Bragg Grating (FBG) type sensors configured to be directly placed on a surface of the end of the railway rails.

14. A railway track comprising at least two railway rails, a plurality of ties, at least two mechanical joints provided with respective fixing means, and at least one monitoring apparatus according to claim 1.

15. A kit for railway mechanical joints comprising a mechanical joint, or an insulated joint, two jaws or brackets, a plurality of fixing bolts or rag-bolts, and a monitoring apparatus according to claim 1.

\* \* \* \* \*